United States Patent
Musabini (10) Patent No.: US 12,253,853 B2
(45) Date of Patent: Mar. 18, 2025

(54) METHOD FOR REMOTELY CONTROLLED DRIVING OF A MOTOR VEHICLE COMPRISING A TELEOPERATOR, COMPUTER PROGRAM PRODUCT, AND TELEOPERATION DRIVING SYSTEM

(71) Applicant: Valeo Schalter und Sensoren GmbH, Bietigheim-Bissingen (DE)

(72) Inventor: Antonyo Musabini, Bobigny (FR)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 361 days.

(21) Appl. No.: 17/782,516

(22) PCT Filed: Nov. 30, 2020

(86) PCT No.: PCT/EP2020/083870
§ 371 (c)(1),
(2) Date: Jun. 3, 2022

(87) PCT Pub. No.: WO2021/110579
PCT Pub. Date: Jun. 10, 2021

(65) Prior Publication Data
US 2023/0004154 A1    Jan. 5, 2023

(30) Foreign Application Priority Data

Dec. 3, 2019    (DE) .................. 10 2019 132 759.8

(51) Int. Cl.
G05D 1/00    (2024.01)
(52) U.S. Cl.
CPC .................... *G05D 1/0038* (2013.01)
(58) Field of Classification Search
CPC .................................................. G05D 1/0038
(Continued)

(56) References Cited

U.S. PATENT DOCUMENTS 6,989,754 B2   1/2006  Kisacanin et al.
8,384,534 B2   2/2013  James et al.
(Continued)

FOREIGN PATENT DOCUMENTS

DE   102011084367 A1   4/2013
DE   102016013971 A1   5/2017
(Continued)

OTHER PUBLICATIONS

International Search Report and Written Opinion in corresponding International Application No. PCT/EP2020/083870, dated Mar. 11, 2021 (9 pages).
(Continued)

*Primary Examiner* — Andrew Joseph Rudy
(74) *Attorney, Agent, or Firm* — Osha Bergman Watanabe & Burton LLP (57) ABSTRACT

A method for remotely controlled driving of a motor vehicle, characterized in that by the motor vehicle a transport travel with at least one passenger in the motor vehicle is performed. The driving of the motor vehicle during the transport drive, at least in phases, is performed in teleoperated manner by an external teleoperator from an operator location. During the teleoperated driving environmental information of the motor vehicle is transmitted to the operator location and displayed at least on one display unit for the teleoperator. During the teleoperated driving a viewing direction of the teleoperator on the display unit is determined, and is displayed on the display unit where the teleoperator gazes. This image region, at which the teleoperator gazes, is visually marked on a display unit in the motor vehicle.

15 Claims, 3 Drawing Sheets

(58) Field of Classification Search
USPC .............................................................. 701/2
See application file for complete search history.

(56) References Cited

U.S. PATENT DOCUMENTS

| | | | | |
|---|---|---|---|---|
| 9,773,179 | B2 * | 9/2017 | Vicente | ..................... G06T 7/75 |
| 10,086,839 | B2 * | 10/2018 | Tellis | .................. B60W 50/082 |
| 10,908,604 | B2 * | 2/2021 | Rastoll | ............... B62D 15/0285 |
| 11,526,165 | B1 * | 12/2022 | Benavidez | ........... G05D 1/0044 |
| 12,007,765 | B2 * | 6/2024 | Petzold | .................. B60K 35/00 |
| 2015/0229885 | A1 | 8/2015 | Offenhaeuser | |

FOREIGN PATENT DOCUMENTS

| | | |
|---|---|---|
| EP | 2700566 A2 | 2/2014 |
| JP | H09167049 A | 6/1997 |
| WO | 03060416 A1 | 7/2003 |

OTHER PUBLICATIONS

Mark Harris: "CES 2018: Phantom Auto Demonstrates First Remote-Controlled Car on Public Roads", veröffentlicht am Oct. 1, 2018 unter https://spectrum.ieee.org/cars-that-think/transportation/self-driving/ces-2018-phantom-auto-demonstrates-first-remotecontrolled-car-on-public-roads (4 pages).
National Phase Application in corresponding U.S. Appl. No. 17/311,185, dated Jun. 4, 2021 (46 pages).

* cited by examiner

METHOD FOR REMOTELY CONTROLLED DRIVING OF A MOTOR VEHICLE COMPRISING A TELEOPERATOR, COMPUTER PROGRAM PRODUCT, AND TELEOPERATION DRIVING SYSTEM

One aspect of the invention relates to a method for remotely controlled driving of a motor vehicle. A further aspect of the invention relates to a computer program product. Yet a further aspect of the invention relates to an electronic teleoperation driving system for a motor vehicle.

A teleoperated driving of motor vehicles is known. In this connection solutions are known, in which a user of the vehicle himself leaves the vehicle and performs the maneuvering operation of the vehicle with a manually operated remote control, in particular for parking. This, however, is possible only for small and short maneuvering operations, such as for instance parking. Moreover the user performing the remote control needs to be positioned in the immediate environment of the vehicle.

Moreover also already teleoperated operations as remotely controlled driving of a motor vehicle are known. In these an operator is arranged remote from the vehicle. In particular in order to be able to maneuver a vehicle also more comprehensively and longer, also over long distances and in general traffic. Such teleoperated driving operations for driving a motor vehicle are relatively complex. They therefore require a high level of attention in order to be able to safely perform this teleoperated driving of the motor vehicle.

It is the task of the present invention to provide a method, in which a specific remotely controlled driving of a motor vehicle can be performed more safely. Accordingly, it is also the task to provide a computer program product as well as an electronic teleoperation driving system.

One aspect of the invention relates to a method for remotely controlled driving of a motor vehicle. With the motor vehicle a transport travel with a passenger in the motor vehicle is performed. The driving of the motor vehicle during the transport travel or drive at least in phases is performed in teleoperated manner by an external operator, who can also be designated as teleoperator, from an operator location. During the teleoperated driving environmental information of the motor vehicle, which is captured by at least one optical capture unit of the motor vehicle, is transmitted to the operator location. This transmitted environmental information is displayed at least on one display unit at the operator location for the operator. During the teleoperated driving a viewing direction of the operator to the display unit is determined. It is captured at which image region of the image displayed on the display unit the operator gazes. The image region, at which the operator gazes on his display unit, is marked in an image, which is displayed on a display unit in the motor vehicle. By such configuration it is facilitated for the passenger in the motor vehicle to recognize where the operator gazes at the operator location, which is external thereto and remote therefrom, or at which image region he directs his gaze. Thereby for the passenger in the motor vehicle it can be recognized, whether the operator has an attentive gaze for teleoperated driving of the vehicle. Thus, it can also be recognized by the passenger in the motor vehicle whether the teleoperator performs the teleoperated driving of the motor vehicle in an attentive manner. In particular thereby it can also be recognized whether the teleoperator directs his gaze at least to one image region in the image, which is important for the driving of the motor vehicle. In particular thus it can be recognized by the passenger in the motor vehicle whether the teleoperator has an eye on critical subregions of the environmental region or not. In particular has an eye on such image regions, which are relevant to the continued safe driving of the motor vehicle. In particular thus it is also possible that the passenger in the motor vehicle himself can assess whether the teleoperator performs a safely teleoperated driving of the motor vehicle or not. Thus, also a confidence-building measure for the passenger in the motor vehicle is facilitated during such teleoperated driving of a motor vehicle.

In particular also a method for observing a teleoperator is presented as one aspect of the invention. During this observing of the teleoperator his viewing direction is captured at his operator location, which is external to and remote from the motor vehicle, and is evaluated. In this connection in particular the viewing direction on an image, which is displayed on a display unit at the operator location, is determined. In particular therein this viewing direction is captured with an eye-tracking device at the operator location. In particular it is envisaged in this connection that a point of intersection of a vector of the viewing direction of the operator with the image plane is determined. Based on this point of intersection it can then also be determined, which image region the operator has an eye on. In this method for observing a teleoperator then at least one subregion of the image, which is displayed on the display unit at the operator location, is also displayed on the display unit in the motor vehicle. On the image of the display unit of the motor vehicle that image region is visually marked, which the teleoperator on the image displayed on the display unit at the operator location presently has an eye on. This is performed in particular during a transport drive of a passenger with the motor vehicle. In particular thus during the observation of the viewing direction of the teleoperator the image region observed by the viewing direction is displayed on the display unit of the motor vehicle. In particular this is effected in an image, which displays the observed image region of the operator at least partially.

On the whole it is facilitated by the invention to perform a safe teleoperated driving of a motor vehicle.

In the case of a teleoperated driving of a motor vehicle the operator location commonly is within a building. This is usually arranged remote and far away from the motor vehicle to be driven in a teleoperated manner. Consequently the teleoperator cannot see the motor vehicle directly. Here the most varied distances, up to many hundreds or many thousands of kilometers can be given. In particular at one operator location at least one display unit is arranged. Preferably these are several separate display units. It is preferably envisaged that in each case individual images taken by one or several capture units of the motor vehicle are displayed on these several display units. Thus, it may be envisaged that on a display unit the image taken by a first optical capture unit of the motor vehicle is displayed. On a second display unit at the operator location an image can be displayed, which is taken by a second optical capture unit of the motor vehicle. On a third display unit at the operator location an image can be displayed, which is taken by a third optical capture unit of the motor vehicle. For instance it may be envisaged that on a fourth display unit at the operator location an image is represented, which is captured by a fourth optical capture unit of the motor vehicle. In particular the optical capture units can be arranged in such a way on the motor vehicle that circumferentially around the motor vehicle quasi an uninterrupted detection range is generated. Thus, the said environmental region around the motor vehicle can be captured and displayed.

In an advantageous embodiment a teleoperation driving system in addition to the operator location comprises a wireless communication link. For instance in this connection a wireless communication link to a computing unit, in particular a computing center, may be provided. Via same corresponding data can be deposited or exchanged. For instance here also a connection with the internet can be given. Equally it is possible that moreover a wireless communication link between the motor vehicle and the internet is effected. For instance this may be the case via a mobile radio channel. In particular this may be effected on the basis of the 5G mobile radio standard.

At the operator location in particular also a steering device is given. This steering device, which may for instance be a steering wheel, is actuated by the teleoperator. Thereby, a situation is suggested to the teleoperator as if he also actually in the motor vehicle would operate corresponding function components and thus perform a teleoperating close to reality.

In particular it is also envisaged that at the operator location an acoustic communication device is arranged. Thereby an acoustic communication between the teleoperator and the passenger in the motor vehicle can be performed.

It may also be envisaged that at the motor vehicle a further optical capture unit is arranged, which is not a camera. In particular by the at least one camera the taking of at least one image, as it has been set out in the above, is performed. The motor vehicle moreover can comprise at least one laser scanner. By the laser scanner, which may for instance be a LIDAR sensor, the position of an object in the environmental region can be precisely determined. In particular thereby the determination of a position of an object in the environmental region in a more accurate manner than with a camera is possible. Instead of a laser scanner, however, also other sensors can be used in order to determine the position of an object in the environmental region of the motor vehicle.

In particular on the basis of the environmental information obtained through the laser scanner it is also possible to determine that image region more precisely, at which the operator gazes on the image in his display unit. In this way it is possible that respective areas of a field of vision or of a detection range of a capture unit are assigned to respective image regions of the image on the display unit. In the same way also the environmental data provided by the laser scanner can be assigned to corresponding image regions of the image on the display unit. This means if then the teleoperator gazes at a certain region or at a certain position on the display unit, it can easily be determined, which real position in the environmental region of the vehicle corresponds to this position looked at by the teleoperator. Thus, the output of the laser scanner, namely the environmental data, can be projected onto the field of vision or the detection range of the optical capture unit of the motor vehicle, configured as camera, in order to determine which pixels of the image on the display unit correspond to which portions of the objects in the real world in the environmental region of the motor vehicle. Thus an even more precise determination can be performed as to which image region the teleoperator actually gazes at.

Preferably on the display unit in the motor vehicle at least in portions the image is displayed, which is displayed on the display unit at the operator location. In particular an image is displayed on the display unit in the motor vehicle, on which that image region is comprised, at which the operator gazes on his display unit. Thus, at any time during the transport drive it can be recognized by the passenger in the motor vehicle, what the operator presently directs his main visual focus at.

Preferably it is envisaged that the image displayed on the display unit at the operator location is synchronized in time with the image displayed on the display unit in the motor vehicle. By such design a display particularly close to reality and quasi congruent on the two display units is facilitated. In particular the passenger in the motor vehicle thus can recognize where the viewing direction of the operator in the operator location currently is directed. Thus for the passenger it is immediately recognizable where the operator is currently looking. In an advantageous embodiment it is envisaged that an image of the environmental region, which is taken by the optical capture unit of the motor vehicle, is displayed on the display unit at the operator location. This is a further very advantageous embodiment in order to perform a safe teleoperated driving of the motor vehicle. Thus the operator on his display unit by the respective image representations recognizes the environmental region of the motor vehicle in real time. The teleoperated driving of the motor vehicle thereby is possible in such a way as if the teleoperator were sitting directly in the motor vehicle himself. Thereby a very realistic and safe teleoperated driving of the motor vehicle is achieved.

Preferably it is envisaged that an image taken of the environmental region is performed by the optical capture unit as video recording and a display of the video recording is displayed on the display unit of the operator location. Basically, with the formulation that an image is taken and/or an image is displayed, both the representation of static frames as well as the representation of a video is understood. By the representation of a video thus a dynamic representation process can be effected. Thus, the environmental region, which is perceived during the movement of the motor vehicle and which is dynamically changing, can be displayed both to the teleoperator and to the passenger in the motor vehicle on the respective display units. Also thereby a safe and realistic teleoperated driving is facilitated. In particularly advantageous way it is thereby also facilitated to visually mark the dynamic representation of the viewing direction of the teleoperator and/or a change in the viewing direction in real time on the image on the display unit in the motor vehicle. Thus, it is also rendered possible that the observing of the teleoperator is represented to the passenger in the motor vehicle in real time. Rather, quasi indirectly by the visual marking in the image on the display unit of the motor vehicle the looking around of the teleoperator at the operator location is displayed.

Thus a situation is quasi optically represented to the passenger in the motor vehicle, in which he quasi from the image perspective of the teleoperator recognizes those image regions, at which the teleoperator gazes. Thus, it is optically displayed to the passenger in the motor vehicle how a teledriver of the vehicle perceives an environmental region.

In an advantageous embodiment it is envisaged that the viewing direction of the teleoperator during the teleoperated driving of the motor vehicle is permanently captured. In particular also a change in the viewing direction is dynamically captured. In particular this change in the viewing direction and/or the static viewing direction of the teleoperator is permanently displayed on the display unit in the motor vehicle. In particular this is effected in the image, which is displayed on the display unit in the motor vehicle.

It may be envisaged that a marking of the current viewing direction and/or a change in the viewing direction of the teleoperator on a display unit in the motor vehicle is effected in dynamically changeable manner. In particular it may be envisaged here that this dynamic display is effected synchronized with the actual real way of behaviour of the teleoperator at the operator location. In particular here a marking of the current viewing direction and/or a change in the viewing direction is displayed in real time on the image of the display unit in the motor vehicle. Also thereby an immediate recognition of the actual observation situation of the teleoperator in the motor vehicle is easily recognized. Also thereby a high safety for the passenger in the motor vehicle is achieved. He therefore knows, in particular invariably, how the actual mode of observation and way of behaviour of the teleoperator at the quasi presently indicated point in time actually is.

Preferably it is envisaged that the marking of the image region, at which the operator on his display unit currently gazes, in the image displayed on the display unit in the motor vehicle, is signaled in color. Additionally or instead, also a region boundary contour can be visually signaled. A color signaling can be easily recognized by the passenger in the motor vehicle. Thus, it can also very rapidly be recognized whether the teleoperator has an eye on the environmental regions relevant for the safe driving of the motor vehicle by a teleoperation. A color signaling can for instance be performed to the effect that an image region is represented as a surface in one signaling color. In particular it is envisaged that this color signaling is opaque or transparent. This means that the environmental region, which is represented by the image region in the image, continues to be recognizable through the color signaling. Thus the entire displayed image is not undesirably disrupted or rendered incomprehensible by color spots. Rather the entire environmental region to be represented by the image continues to be recognizable. Superimposed thereon is the color signaling. Thus the surface area can unambiguously be visually recognized, which is currently observed by the teleoperator. By displaying only one region boundary contour of the observed image region in an additional or alternative embodiment, in an equally easily comprehensible way and without obstructing other image information, that image region can be marked, at which the teleoperator is currently looking. A boundary contour may for instance be a solid line or a dashed line. In particular if due to environmental influences, such as a corresponding brightness, the color signaling is not suitable, such a display of only the region boundary contour can be effected. Equally this then is possible, if that environmental region, at which the teleoperator in the image is presently gazing and which then is to be signaled in color on the display unit in the motor vehicle, is of such significance and relevance that such, in particular opaque, color superimposition in not desired. Thus in particular depending on specific criteria it can also be decided by the teleoperating driving system how the respective visual marking in the image on the display unit in the motor vehicle should be effected. Equally it is possible that depending on traffic situations and/or objects, which were detected in the environmental region of the motor vehicle and/or depending on a previous viewing direction of the teleoperator and/or depending on the duration of how long the teleoperator has looked in one viewing direction and/or the duration for which the teleoperator presently gazes in one viewing direction, also a change of color signaling and/or a change of region boundary contour occur. For instance here a change in color and/or a dynamic flashing of the color signaling may occur. The same in analogy may happen with a region boundary contour. Thus not only a static optical marking of the viewing direction of the teleoperator is performed. Rather also past and/or current ways of behaviour of the teleoperator and/or current and/or future situations in the environmental region of the motor vehicle with regard to the optical marking of the viewing direction can be taken into consideration. Thus a visual marking of the viewing direction of the teleoperator on the display unit of the vehicle that is better adjusted to the situation is facilitated. Thus different attention states and/or different safety-critical states in driving the motor vehicle can be taken into consideration. In particular thereby possibly the passenger in the motor vehicle can be informed in a more unambiguous way about the degree of attention in the light of these above-named evaluation criteria. In particular the passenger then depending thereon can better decide for himself how to evaluate the attention state of the teleoperator. In particular depending thereon then also a way of acting of the passenger can be better assessed. In particular this relates to a corresponding speech communication with the teleoperator. In particular with regard to his/her viewing direction and/or his/her attention state.

Advantageously in this connection the passenger can also better recognize and/or evaluate whether the teleoperator recognizes and/or correctly assesses information in the environmental region in order to perform a safe teleoperated driving of the motor vehicle.

In particular it can then also be recognized by the passenger whether the teleoperator fails to recognize information in the environmental region and in particular is not provided with same, since they possibly are not or only insufficiently captured by the optical capture units of the motor vehicle.

In an advantageous embodiment it is envisaged that the passenger depending on the marked viewing direction of the operator on the display unit in the motor vehicle transmits an action information to the operator if falling below an attention criterion of the operator. For instance this may be the case with the above-named examples. In particular also with regard to the evaluation, as to how a safe driving of the motor vehicle is to be performed, a change of the teleoperated driving of the motor vehicle is demanded or asked for by the passenger.

In particular it is facilitated that by this visual marking on the image of the display unit of the motor vehicle, in particular by the passenger, it can be recognized whether the teleoperator for the safe driving of the motor vehicle keeps an eye on relevant traffic zones. Such traffic zones can for instance be a pedestrian crossing, a sidewalk, a bike path, or the like. Also confusing intersections or unclear entrances and exits can be considered as such traffic zones.

In an advantageous embodiment it is envisaged that as action information a speech signal is transmitted from the passenger to the teleoperator. This can be effected via a communication link, in particular a wireless communication link. An action information can be a notification information about a corresponding traffic zone, which the teleoperator presently has no eye on. An action information, however, can additionally or instead also be an instruction of the passenger about the way in which the teleoperator is meant to perform the teleoperated driving of the motor vehicle.

It may be envisaged that the safety categories for traffic zones are predetermined by the passenger. This can in particular occur prior to the beginning of the transport travel. In particular same can be effected by a passenger-specific user profile. Same can be deposited with the teleoperation driving system. Additionally a classification of traffic situations of the passenger, in particular prior to the transport travel, can be predetermined. Also it can be deposited in an electronic user profile. This electronic user profile can be communicated to the operator prior to the beginning of the teleoperated driving. Thereby the teleoperator can perform his teleoperated driving of the motor vehicle depending on this user profile. In particular thereby also a correspondingly adapted teleoperated driving can be effected. In particular this information from the user profile of the passenger can be displayed on a display unit at the operator location. Additionally or instead also an optical display in images on a display unit of the operator at the operator location can be effected. In particular the operator is alerted to what is important to the passenger when driving the vehicle. In particular thus a corresponding sense of safety of the passenger during the teleoperated driving of the vehicle can be enhanced.

In particular in instances where the passenger knows the route of the transport travel, in particular possibly also knows the traffic-critical spots, thereby the teleoperator's awareness can also already be raised and he can be better prepared for the teleoperated driving of the vehicle. In particular then the awareness of the teleoperator is raised in this regard for his teleoperated transport travel.

It may also be envisaged that depending on the environmental region captured by the optical capture unit and/or on an environmental region not or not yet captured by the optical capture unit, which, however, is already recognized by the passenger, the environmental region is divided into zones, which are assigned to individual safety categories. Depending on this categorization the optically marked image region is evaluated and in the case of a deviation of the marked image region of a zone with a safety category larger than a safety threshold value an action information is transmitted to the teleoperator. By such design not only the teleoperated driving can be effected more safely. Rather also the subjective sense of safety of the passenger in the motor vehicle can be raised. A driving of the motor vehicle geared to the individual passenger is thereby rendered possible.

A further aspect of the invention relates to a computer program product with instructions, which, if the computer program product is performed by a computer, cause the computer to perform the steps according to the method as it was named in the above or an advantageous implementation thereof.

A further aspect of the invention relates to a teleoperation driving system. This comprises an operator location. Same is arranged external to and remote from a motor vehicle, which is to be driven in a teleoperated manner. It moreover comprises at least one optical capture unit, which is arranged on a motor vehicle. Moreover the teleoperation driving system comprises a display unit in the motor vehicle and a display unit at the operator location. The teleoperation driving system comprises at least one control and/or computing unit, which is configured, to perform a method according to the above-named aspect or an advantageous embodiment thereof. In particular the teleoperation driving system comprises a computer program product as it was named in the above. The control unit in this connection may be the computer.

Preferably this teleoperation driving system comprises at least one eye tracking device, which is arranged at the operator location. By same the viewing direction of the operator can be detected. Additionally or instead, the teleoperation driving system can comprise at least one laser scanner, which is arranged at the motor vehicle, and by which a position of an object in the environmental region of the motor vehicle can be detected. Objects in this connection can be static as well as dynamic objects. These can be other traffic participants, such as pedestrians, cyclists, motorcyclists, or other vehicles. However, it can also be a border stone, a building, a tree, a bush, a parking, a footpath, a cycle path, a pedestrian crossing, or any kind of static object corresponding to traffic signs. This list of potential objects in the environmental region is not to be understood as final.

In particular the teleoperation driving system also comprises at least one microphone, which is arranged at the motor vehicle. By the microphone noises in the environment of the motor vehicle and/or in the interior of the motor vehicle can be captured. These noises can be transmitted to a unit at the operator location. There they can be output as acoustic signals to the operator. Thereby the perception and the comprehension of the image displayed on the display units at the operator location for the operator is improved and closer to reality. Individual traffic situations, which are represented by the images, can then be understood and assessed in an improved way for the operator.

A further aspect of the invention relates to a motor vehicle, which comprises a display unit and at least one communication unit, by means of which the possibility is provided to conduct a communication with an operator location.

Further features of the invention are apparent from the claims, the figures and the description of figures. The features and feature combinations mentioned above in the description as well as the features and feature combinations mentioned below in the description of figures and/or shown in the figures alone are usable not only in the respectively specified combination, but also in other combinations without departing from the scope of the invention. Thus, implementations are also to be considered as encompassed and disclosed by the invention, which are not explicitly shown in the figures and explained, but arise from and can be generated by the separated feature combinations from the explained implementations. Implementations and feature combinations are also to be considered as disclosed, which thus do not comprise all of the features of an originally formulated independent claim. Moreover, implementations and feature combinations are to be considered as disclosed, in particular by the implementations set out above, which extend beyond or deviate from the feature combinations set out in the back-references of the claims.

Embodiments of the invention are explained in the following in more detail on the basis of schematic drawings.

These show in.

In the figures same elements or elements having the same function are equipped with the same reference signs.

Figure 1:
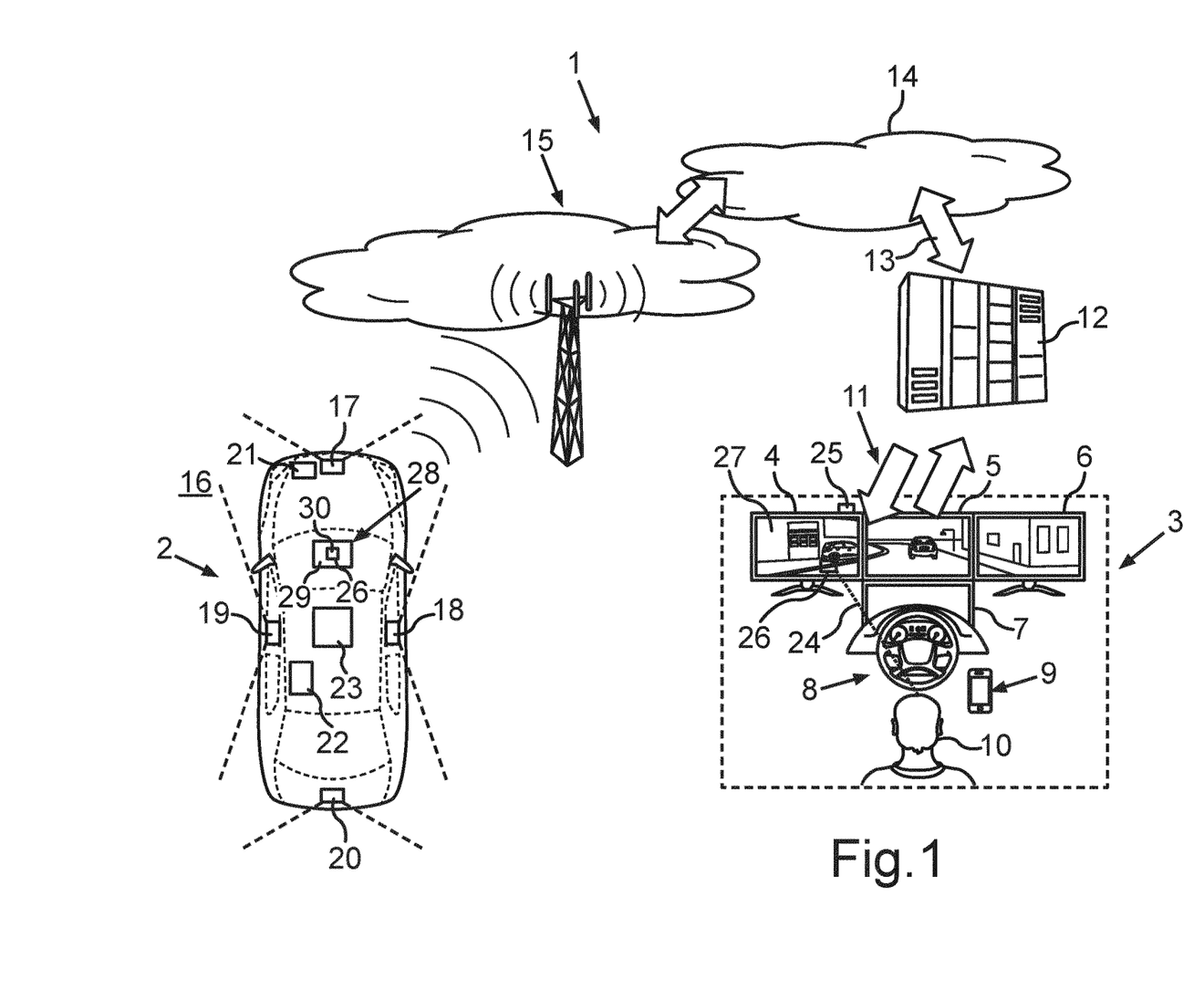
FIG. 1 a schematic representation of an embodiment of a teleoperation driving system.

In FIG. 1 in a schematic representation an electronic teleoperation driving system 1 is shown. With this teleoperation driving system 1 a motor vehicle 2 can be driven remotely controlled, namely in a teleoperated way. The motor vehicle 2 is intended to be provided for the transport of persons. The teleoperation driving system 1 has an operator location 3. This is located in particular in a building. The operator location 3 comprises at least one display unit. In the embodiment several display units, in particular a display unit 4, a further display unit 5, yet a further display unit 6 are provided. In particular at least one fourth display unit 7 is arranged at the operator location 3. The display units 4 to 7 are in particular screens. Moreover the operator location 3 comprises a steering unit, in particular a steering wheel 8. Moreover an acoustic communication unit 9 is arranged at the operator location 3. An operator, which is shown merely symbolically in FIG. 1 and which can also be referred to as teleoperator 10 and is a human, is present at the operator location 3. This teleoperator 10 conducts the teleoperated driving of the motor vehicle 2.

The operator location 3 in an advantageous embodiment can communicate wirelessly via a wireless communication link 11 with a computing unit 12, in particular a server. This computing unit 12 can be linked via a communication link 13 for instance to the internet 14. Via a further communication link 15 the motor vehicle 2 can wirelessly communicate with the internet 14. In particular it is possible that here it is communicated via a mobile radio standard, in particular the 5G standard. Also a direct communication link between the motor vehicle 2 and the operator location 3 can be provided. In particular the 5G standard.

The motor vehicle 2 is in particular a fully autonomous vehicle. It has in particular the autonomy level 5. It is thus a motor vehicle 2 driving without driver.

The motor vehicle 2 comprises at least one capture unit, by which an environmental region 16 of the motor vehicle 2 can be captured. In particular the motor vehicle 2 comprises an optical capture unit for this purpose. In particular in this connection as an optical capture unit a camera 17 can be provided, which is sensitive in the spectral range visible for human beings. Same is configured for capturing the environmental subregion located in front of the motor vehicle 2. Moreover the motor vehicle 2 can comprise additional optical capture units 18, 19, and 20. These, too, can be cameras. The detection ranges of the optical capture units 18 and 19 are arranged at the opposite side regions on the motor vehicle 2 and are oriented for detection of the lateral environmental subregions of the environmental region 16. The optical capture unit 20 is oriented backward in order to capture the environmental subregion of the environmental region 16 behind the motor vehicle 2.

The motor vehicle 2 in an advantageous embodiment can additionally comprise at least one laser scanner 21. Same detects the environmental subregion in particular in front of the motor vehicle 2.

In particular the motor vehicle 2 also comprises a control unit 22.

Symbolically a passenger 23 is positioned in the motor vehicle 2. This passenger 23 would like to conduct a transport travel with the motor vehicle 2 or does conduct it with the motor vehicle 2. This driving of the motor vehicle 2 during the transport drive is performed at least in phases, in particular completely, by the external teleoperator 10 in teleoperated manner from the operator location 3. In this teleoperated driving environmental information of the environmental region 16 of the motor vehicle 2 are captured by at least one optical capture unit 17 to 20. This captured information, in particular images, in particular videos, are transmitted to the operator location 3. At the operator location 3 these images are displayed at least on one display unit 4 to 7. It may be envisaged that for instance the images captured by the optical capture unit 17 are transmitted to the operator location 3 and there displayed on a centrally positioned display unit 5. It may be envisaged that the images captured by the optical capture unit 18 are transmitted to the operator location 3 and displayed on the display unit 6 on the right side. It may be envisaged that images captured by the optical capture unit 20 are displayed on the display unit 7 arranged at the center and below the display unit 5. In particular it is envisaged that images transmitted by the optical capture unit 19 are transmitted to the operator location 3 and displayed there on the display unit 4 arranged on the left side.

Figure 2:
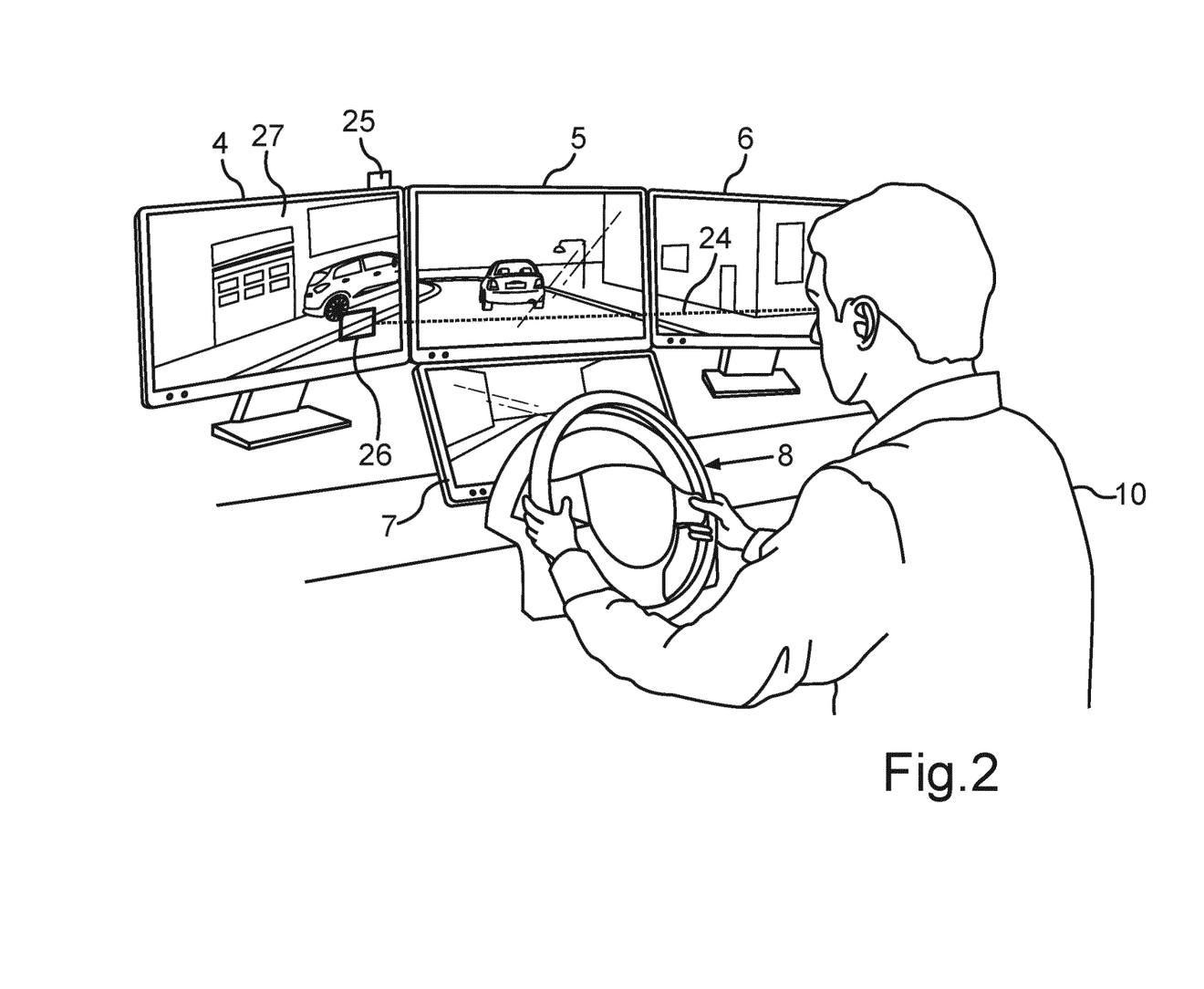
FIG. 2 a schematic representation of an operator location of the teleoperation driving system according to FIG. 1.

During the teleoperated driving of the motor vehicle 2 a viewing direction 24 (FIG. 2) of the teleoperator 10 is captured. For this purpose in particular an eye-tracking device 25 (FIG. 1), which is arranged at the operator location 3, is used. Therein it is detected at which image region 26 of an image 27 displayed on the display unit 4 and/or 5 and/or 6 and/or 7 the gaze of the teleoperator 10 is directed. In particular therein it is also determined at which place of the image the vector of the viewing direction 24 intersects or touches this image plane.

In particular based on information of the at least one laser scanner 21 positions of real objects in the environmental region 16 can be determined. In addition to this information and the knowledge, which image representation is effected on the display unit 5, it can also be determined, at which image region or at which object the teleoperator 10 is presently gazing.

The motor vehicle 2 comprises in particular at least one display unit 28 (FIG. 1). On this display unit 28 an image 29 is displayed, which in particular comprises a subregion of the image 27, at which the teleoperator 10 presently gazes. This image 29 on the display unit 28 advantageously equally shows at least the image region 26, at which the teleoperator presently gazes in the image 27. In particular it is envisaged that this image region 26, at which the teleoperator 10 presently gazes on his display unit, in the example here the display unit 5, is marked on the image 29 of the display unit 28 in the motor vehicle 2, in particular visually marked. For this purpose in the embodiment it is envisaged that this region 26 is marked in color or signaled in color. For instance here a surface coloring in a coloring contrasting with the other regions of the image 29 can be effected. In particular this color signaling is effected to be transparent or opaque. Thereby the actual environmental information of this image region 26 can also still be recognized through this coloring 30. Thus in this connection for instance in FIG. 3 it is recognizable that the teleoperator 10 gazes at a specific region of a pedestrian way and/or cycle path 31. This is marked in the image 29 by the color signaling or coloring 30. Thus the passenger 23 in the vehicle 2 can always and currently recognize at which environmental subregion or at which object the teleoperator 10 presently directs his gaze.

Figure 3:
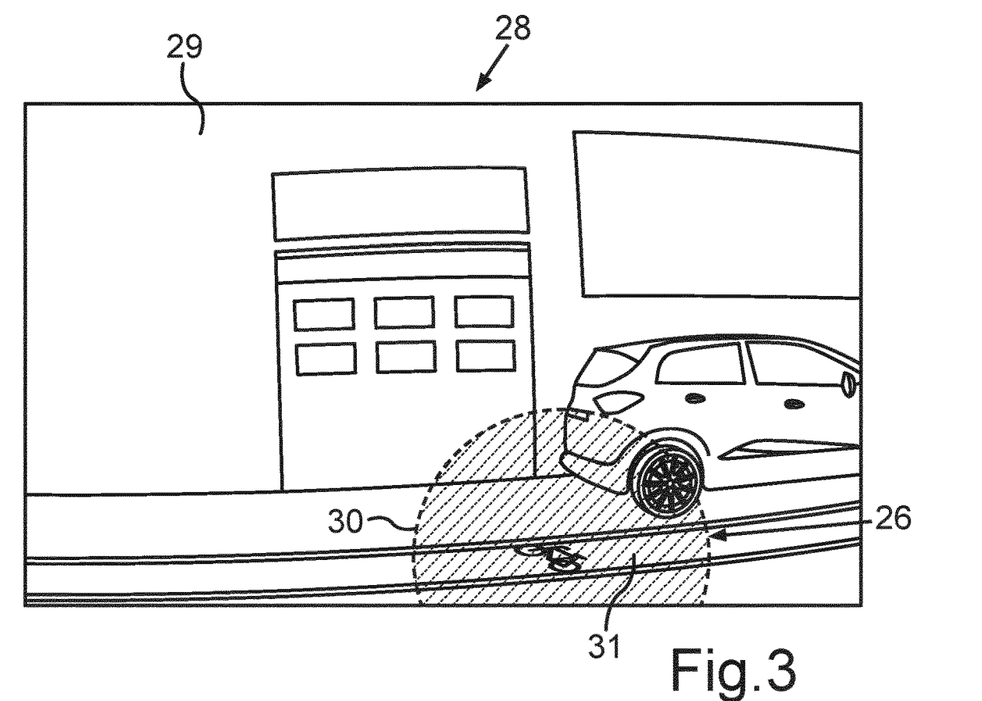
FIG. 3 a representation of an image, which is displayed on a display unit of the motor vehicle, which is driven in teleoperated manner.

In particular it is envisaged that on the display unit 28 in the motor vehicle 2 at least in portions the image 27 is displayed, which is displayed on the display unit 5 at the operator location 3. In particular this image 27, which is displayed on the display unit 5 at the operator location 3, is displayed synchronized in time with the image 29 displayed on the display unit 28 in the motor vehicle 2. In particular it is envisaged that the image, which is taken by the optical capture unit 17 and/or 18 and/or 19 and/or 20, is displayed in real time on the display unit 4 and/or 5 and/or 6 and/or 7 at the operator location 3. In particular the images taken are recorded as videos and also displayed as videos on the corresponding display units 4 to 7, 28. In particular the viewing direction 24 of the operator is permanently captured during the teleoperated driving of the motor vehicle 2. In particular thus the respective viewing direction as well as a change in the viewing direction can be captured uninterrupted. Thus also dynamic changes in the viewing direction can be captured without restriction. Also in this regard a color signaling 30, which is synchronized and represented in real time, can be effected, in particular also be effected in a dynamically changeable manner. In addition to or instead of the surface color signaling also a region boundary contour of this image region 26 can be visually signaled. Depending on the specific criteria also a change in color and/or a change of the region boundary contour can be effected. Also in this regard a dynamic change can be effected.

It may be envisaged that the passenger 23 depending on the marked viewing direction 24 of the operator 10 on the display unit 28 transmits an action information to the operator 10. In particular if falling below an attention criterion of the operator 10. The action information can be a speech signal. This can be transmitted via a communication link 15, 13, 11 to the operator location 3. Also a direct transmission from the motor vehicle 2 to the operator location 3 can be effected. In particular by this optical marking of the viewing direction 24 of the teleoperator 10 on an image in the motor vehicle 2 it can also be recognized whether the teleoperator 10 perceives critical traffic situations and/or specific traffic zones as required in order to be able to perform a safe teleoperated driving of the motor vehicle 2.

It is also possible that the display on the in particular only one display unit 28 in the motor vehicle 2 can dynamically change. This is in particular for instance then the case if the operator 10 changes a gaze from one display unit 4 to 7 to another display 4 to 7 at his operator location 3. In particular if he for instance according to the representation in FIG. 2 gazes away from the image 27 on the display unit 5 and for instance directs his gaze at the image displayed on the display unit 4. This, too, can correspondingly be recognized by the eye-tracking device 25. Then a change of the representation of the image on the display unit 28 in the motor vehicle 2 can then be effected synchronized and in real time. In particular then also the image displayed on the display unit 5 at the operator location 3 is displayed there at least partly. In particular the representation of the image of the display unit 28 is then effected in such a way that again the image region, at which the operator 10 is presently gazing on the display unit 5, is displayed at least partly on the display unit 28. Thus, here, too, always an optical marking of the image region on the display unit 28 can be effected, at which the operator 10 is presently gazing on the respective display unit.

Figure 4:
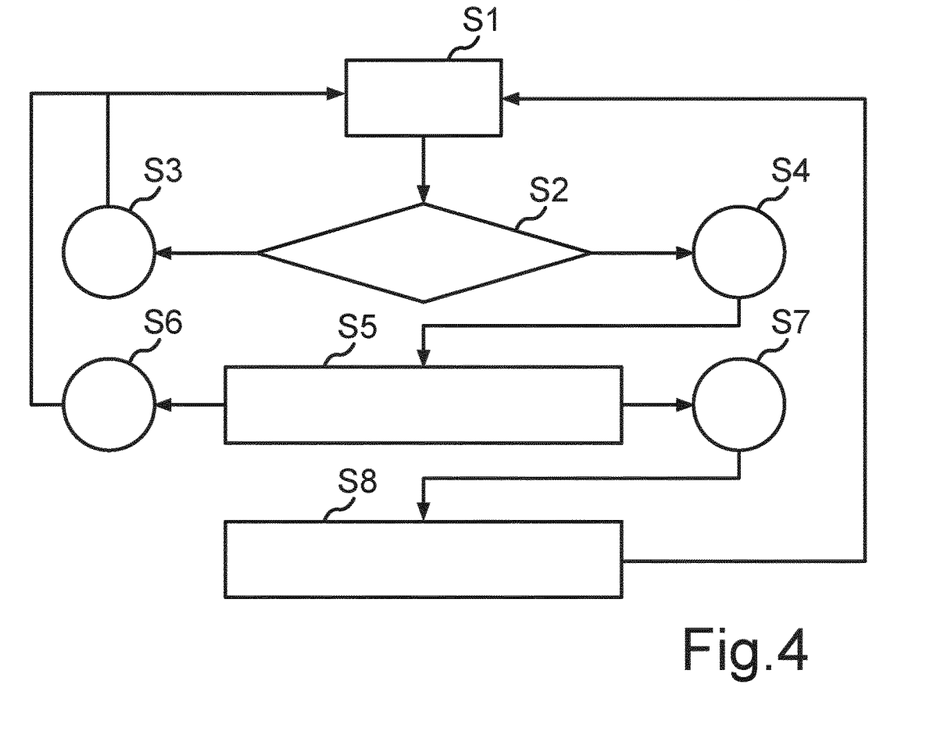
FIG. 4 a schematic flow diagram for an embodiment of a method according to the invention.

Generally according to the simplified flow diagram in FIG. 4 it can be envisaged that in a step S1 the scenario is started. In this connection according to a step S2 it is checked, whether a teleoperated driving is started. If this according to S3 is not the case, it is returned to step S1. If, however, a teleoperated driving according to step S4 is started, in a further step S5 the direction of gaze 24 of the operator 10 is determined. If in this regard no intersection of the viewing direction 24 with an image on a display unit at the operator location 3 is recognized, according to step S6 it is returned to step S1. If such observation is recognized, in which the viewing direction 24 of the operator 10 intersects with the image on a display device 4 to 7, according to step S7 it is proceeded in such a way that the observed image region on the image of the display unit in the motor vehicle 2 is visually marked, as it is set out by step S8.

The invention claimed is:

1. A method for remotely controlled driving of a motor vehicle that is transporting a passenger, the method comprising:

remotely operating the motor vehicle using an external teleoperator who is located at an operator location, wherein the operator location is in a remote location from the motor vehicle;

recording environmental information of an environmental region of the motor vehicle using an optical capture unit of the motor vehicle;

transmitting the environmental information to a display unit at the operator location, wherein the teleoperator views the display unit at the operator location to remotely operate the motor vehicle;

tracking a teleoperator's gaze on the display unit at the operator location using an eye-tracking device to determine a viewing direction of the teleoperator in relation to the display unit at the operator location;

transmitting the viewing direction of the teleoperator to a display unit located in the motor vehicle; and displaying the viewing direction of the teleoperator on the display unit in the motor vehicle, wherein the passenger uses the displayed viewing direction to monitor the teleoperator's gaze.

2. The method according to claim 1, wherein on the display unit in the motor vehicle at least in portions an image is displayed, which is displayed on the display unit at the operator location.

3. The method according to claim 1, wherein the image, which is displayed on the display unit in the operator location, is displayed synchronized in time with the image, which is displayed on the display unit in the motor vehicle.

4. The method according to claim 1, wherein an image of the environmental region, which is taken by the optical capture unit of the motor vehicle, is displayed in real time on the display unit at the operator location.

5. The method according to claim 1, wherein the environmental information comprises an image taken of the environmental region, wherein the image is taken using the optical capture unit and the image includes video recording and a display of the video recording is performed on the display unit of the operator location.

6. The method according to claim 1, wherein the viewing direction of the teleoperator during the teleoperated driving is permanently captured, in particular also a change in the viewing direction captured dynamically.

7. The method according to claim 6, wherein a marking of the current viewing direction and/or a change in the viewing direction on the display unit in the motor vehicle is effected in dynamically changeable manner synchronized in real time.

8. The method according to claim 1, wherein the marking of the image region, at which the teleoperator is currently gazing on his display unit, in the image, which is displayed on the display unit in the motor vehicle, is signaled in color and/or is signaled by a display of a region boundary contour of this image region.

9. The method according to claim 1, wherein the passenger depending on the marked viewing direction of the teleoperator on the display unit in the motor vehicle transmits an action information to the teleoperator if falling below an attention criterion of the teleoperator.

10. The method according to claim 9, wherein as action information a speech signal is transmitted via a communication link.

11. The method according to claim 1, wherein depending on the environmental region captured by the optical capture unit and/or by an environmental subregion of the environmental region, which has not or not yet been captured by the optical capture unit, which however is already recognized by the passenger, the environmental region is subdivided into zones, which are assigned to individual safety categories, wherein depending on this categorization the marked image region is evaluated and in the case of a deviation of the marked image region from a zone with a safety category higher than a safety threshold value, an action information is transmitted to the teleoperator.

12. The method according to claim 1, wherein a classification of traffic situations and/or traffic zones by the passenger prior to the beginning of the transport drive is predetermined, by an electronic passenger profile, wherein the classification is communicated to the teleoperator prior to the beginning of the teleoperated driving.

13. A computer program product comprising instructions, which, when the computer program product is executed by a computer, cause the computer to perform the steps of the method according to claim 1.

14. A teleoperation driving system for teleoperated driving of a motor vehicle, comprising:
- an operator location external to the motor vehicle, comprising at least one optical capture unit of the motor vehicle,
- a display unit located in the motor vehicle and at least one display unit located at the operator location, and
- at least one control and/or computing unit, which is configured to perform a method according to claim 1.

15. The teleoperation driving system according to claim 14, which comprises an eye-tracking device at the operator location, by which the viewing direction of the teleoperator is detectable and/or comprises at least one laser scanner of the motor vehicle, by which a position of an object in the environmental region is detectable.

\* \* \* \* \*